United States Patent
Zhang et al.

(10) Patent No.: US 12,470,644 B2
(45) Date of Patent: Nov. 11, 2025

(54) METHOD AND SYSTEM FOR PROCESSING SESSION DATA OF INTERACTIVE PROCESS, SERVER GROUP, AND COMPUTER READABLE STORAGE MEDIUM

(71) Applicant: Shanghai Lilith Interactive Entertainment Network Technology Co., Ltd., Shanghai (CN)

(72) Inventors: Xing Zhang, Shanghai (CN); Shuo Lin, Shanghai (CN); Jun Zou, Shanghai (CN)

(73) Assignee: Shanghai Lilith Interactive Entertainment Network Technology Co., Ltd., Shanghai (CN)

( * ) Notice: Subject to any disclaimer, the term of this patent is extended or adjusted under 35 U.S.C. 154(b) by 39 days.

(21) Appl. No.: 18/698,247

(22) PCT Filed: Oct. 12, 2022

(86) PCT No.: PCT/CN2022/124791
§ 371 (c)(1),
(2) Date: Apr. 3, 2024

(87) PCT Pub. No.: WO2023/061394
PCT Pub. Date: Apr. 20, 2023

(65) Prior Publication Data
US 2024/0422250 A1    Dec. 19, 2024

(30) Foreign Application Priority Data
Oct. 13, 2021 (CN) .......................... 202111192564.6

(51) Int. Cl.
*H04L 69/00* (2022.01)
*H04L 67/131* (2022.01)
*H04L 67/60* (2022.01)

(52) U.S. Cl.
CPC ............ *H04L 69/26* (2013.01); *H04L 67/131* (2022.05); *H04L 67/60* (2022.05)

(58) Field of Classification Search
None
See application file for complete search history.

(56) References Cited

FOREIGN PATENT DOCUMENTS

| CN | 112615700 A | * | 4/2021 | ........... H04L 1/1607 |
| WO | WO-2009115002 A1 | * | 9/2009 | ............. H04L 12/66 |

OTHER PUBLICATIONS

International Search Report; China National Intellectual Property Administration; International Application No. PCT/CN2022/124791; Nov. 25, 2022; 6 pages.

\* cited by examiner

*Primary Examiner* — Natisha D Cox
(74) *Attorney, Agent, or Firm* — Taft Stettinius & Hollister LLP

(57) ABSTRACT

The present invention provides a method and a system for processing session data in an interactive process, a server group, and a computer readable storage medium. A memory module and a protocol configuration module are configured in a gateway server, keywords can be directly extracted by the protocol configuration module from a session of a client and a feedback session of an interactive logic server, and then the keywords can be directly forwarded, so that the throughput of session data processing is improved. The corresponding data is stored, extracted and forwarded by using the memory module, so that the delay of data transmission is reduced. Because the memory module is arranged in the gateway server, the occurrence rate of interface instability can be reduced.

10 Claims, 3 Drawing Sheets

METHOD AND SYSTEM FOR PROCESSING SESSION DATA OF INTERACTIVE PROCESS, SERVER GROUP, AND COMPUTER READABLE STORAGE MEDIUM

CROSS-REFERENCE TO RELATED APPLICATIONS

This application is a U.S. National Phase of International PCT Application No. PCT/CN2022/124791 filed on Oct. 12, 2022, which claims priority to Chinese Patent Application Serial No. 202111192564.6 filed on Oct. 13, 2021. The contents of those applications are incorporated herein by reference in their entireties.

TECHNICAL FIELD

The present invention relates to the technical field of game servers, and in particular, to a method and a system for processing session data of an interactive process, a server group, and a computer-readable storage medium.

BACKGROUND

When players use software applications, a large number of interactive processes are generated, especially for game applications. With the continuous improvement of the requirement of the players for game experience, for game servers, there is a need to continuously improve the data throughput in an interactive process and reduce the request response time.

In a game server architecture, there are usually a gateway server and a logic server. The gateway server is responsible for establishing a connection with a game client, creating session data, and then forwarding a request of the client to the logic server. After performing logical processing, the logic server sends a reply to the gateway server, and the gateway server replies to the game client.

In the development of game logic, such a requirement is often encountered, and logical processing and determining are performed based on the current session data of the player. The current practice is as follows: When the gateway creates session data, the session data is written into a cache database. When the logic server needs to use the session data, the logic server first accesses the cache database, and then performs logical processing. When the logic server needs to modify the session data, the modified session data needs to be written to the cache database again.

This approach has two disadvantages: when a process needs to involve a request for processing the session data, the process is slower because of the need to read/write the session data. If an additional cache database is added, the risk of instability of the entire server is also increased. When the cache database is unavailable, related interfaces are all unavailable.

SUMMARY

In order to overcome the above technical defects, an object of the present invention is to provide a method and a system for processing session data of an interactive process, a server group, and a computer-readable storage medium for improving the throughput of a game gateway server, reducing the request delay, and reducing the interface instability.

The present invention discloses a method for processing session data of an interactive process, including the following steps: creating, by an interactive client, session data, and sending a request for forwarding the session data to a gateway server; obtaining, by the gateway server, the session data, and reading multiple key fields within the session data; reading, by the gateway server, a protocol rule by using a built-in protocol configuration module, and determining whether the multiple key fields conform to the protocol rule; if the multiple key fields conform to the protocol rule, forwarding, by the gateway server, the session data to an interactive logic server based on a forwarding protocol; where the forwarding protocol includes the read key fields; performing, by the interactive logic server, logical processing on the session data to form reply data, and sending the reply data back to the gateway server by using a reply protocol; storing, by the gateway server, the reply data by using a built-in memory module; obtaining, by the interactive client, the reply data from the memory module; and if the multiple key fields do not conform to the protocol rule, rejecting the request of the interactive client for forwarding the session data, and ending a step.

Preferably, the performing, by the interactive logic server, logical processing on the session data to form reply data, and sending the reply data back to the gateway server by using a reply protocol includes: performing, by the interactive logic server, logical processing on the session data, and modifying the session data by writing a modification field to the session data, to form reply data; where the reply protocol includes the written modification field; and the storing, by the gateway server, the reply data by using the built-in memory module includes: reading, by the gateway server, the modification field by using the reply protocol, and storing the reply data by using the built-in memory module according to the modification field.

Preferably, the protocol rule includes an interception rule and a reading rule; the multiple key fields include multiple first key fields corresponding to the interception rule and multiple second key fields corresponding to the reading rule; and the obtaining, by the gateway server, the session data, and reading multiple key fields within the session data; and reading, by the gateway server, a protocol rule by using a built-in protocol configuration module, and determining whether the multiple key fields conform to the protocol rule includes: determining, by the gateway server, whether the multiple first key fields trigger interception by using the interception rule; if interception is not triggered, reading, by the gateway server, the multiple second key fields by using the reading rule; where the forwarding protocol includes the read second key field; and if interception is triggered, rejecting the request of the interactive client for forwarding the session data.

Preferably, the session data includes a client model, a client version, a username, a user address, and a user level.

Preferably, the first key field includes a user level; and the determining, by the gateway server, whether the multiple first key fields trigger interception by using the interception rule includes: determining, by the gateway server, whether the user level is greater than a preset level value by using the interception rule.

Preferably, the second key field includes a client version; the performing, by the interactive logic server, logical processing on the session data, and modifying the session data by writing a modification field to the session data, to form reply data includes: identifying, by the interactive logic server, different client versions, and writing modification fields corresponding to different client versions to the session data to form different reply data.

Preferably, the modification field includes a user level; and the performing, by the interactive logic server, logical processing on the session data, and modifying the session data by writing a modification field to the session data, to form reply data includes: writing, by the interactive logic server, a new user level to the session data to form new reply data.

The present invention further discloses a system for processing session data of an interactive process, including an interactive client, a gateway server, and an interactive logic server; where the interactive client is connected to the gateway server, and the gateway server is connected to the interactive logic server; the interactive client creates session data, and sends a request for forwarding the session data to the gateway server; the gateway server obtains the session data, and reads multiple key fields within the session data; the gateway server reads a protocol rule by using a built-in protocol configuration module and determines whether the multiple key fields conform to the protocol rule; if the multiple key fields conform to the protocol rule, the gateway server forwards the session data to the interactive logic server based on a forwarding protocol; and the forwarding protocol includes the read key fields. The interactive logic server performs logical processing on the session data to form reply data, and sends the reply data back to the gateway server by using a reply protocol; the gateway server stores the reply data by using a built-in memory module; the interactive client obtains the reply data from the memory module; and if the multiple key fields do not conform to the protocol rule, the gateway server rejects the request of the interactive client for forwarding the session data.

The present invention further discloses a server group for an interactive process, connected to an interactive client, including a gateway server and an interactive logic server; where the interactive client is connected to the gateway server, and the gateway server is connected to the interactive logic server; the interactive client creates session data, and sends a request for forwarding the session data to the gateway server; the gateway server obtains the session data and reads multiple key fields within the session data; the gateway server reads a protocol rule by using a built-in protocol configuration module and determines whether the multiple key fields conform to the protocol rule; if the multiple key fields conform to the protocol rule, the gateway server forwards the session data to the interactive logic server based on a forwarding protocol; the forwarding protocol includes the read key fields; the interactive logic server performs logical processing on the session data to form reply data, and sends the reply data back to the gateway server by using a reply protocol; the gateway server stores the reply data by using a built-in memory module; the interactive client obtains the reply data from the memory module; and if the multiple key fields do not conform to the protocol rule, the gateway server rejects the request of the interactive client for forwarding the session data.

The present invention further discloses a computer-readable storage medium for storing an instruction of processing session data of an interactive process, stored in a server group, where the server group includes a gateway server and an interactive logic server, an interactive client is connected to the gateway server, and the gateway server is connected to the interactive logic server; the interactive client creates session data, and when the instruction is executed, a request for forwarding the session data sent by the interactive client to the gateway server is processed, including the following steps: obtaining, by the gateway server, the session data, and reading multiple key fields in the session data; reading, by the gateway server, a protocol rule by using a built-in protocol configuration module, and determining whether the multiple key fields conform to the protocol rule; if the multiple key fields conform to the protocol rule, forwarding, by the gateway server, the session data to the interactive logic server based on a forwarding protocol; where the forwarding protocol includes the read key fields; performing, by the interactive logic server, logical processing on the session data to form reply data, and sending the reply data back to the gateway server by using a reply protocol; storing, by the gateway server, the reply data by using a built-in memory module; obtaining, by the interactive client, the reply data from the memory module; and if the multiple key fields do not conform to the protocol rule, rejecting, by the gateway server, the request of the interactive client for forwarding the session data.

After adopting the above technical solution, compared with the prior art, the present invention has the following beneficial effects:

1. A memory module and a protocol configuration module are configured in the gateway server, keywords can be directly extracted by the protocol configuration module from a session of a client and a feedback session of an interactive logic server, and then the keywords can be directly forwarded, so that the throughput of session data processing is improved. The corresponding data is stored, extracted and forwarded by using the memory module, so that the delay of data transmission is reduced. Because the memory module is arranged in the gateway server, the occurrence rate of interface instability can be reduced.

DETAILED DESCRIPTION OF EMBODIMENTS

Figure 1:
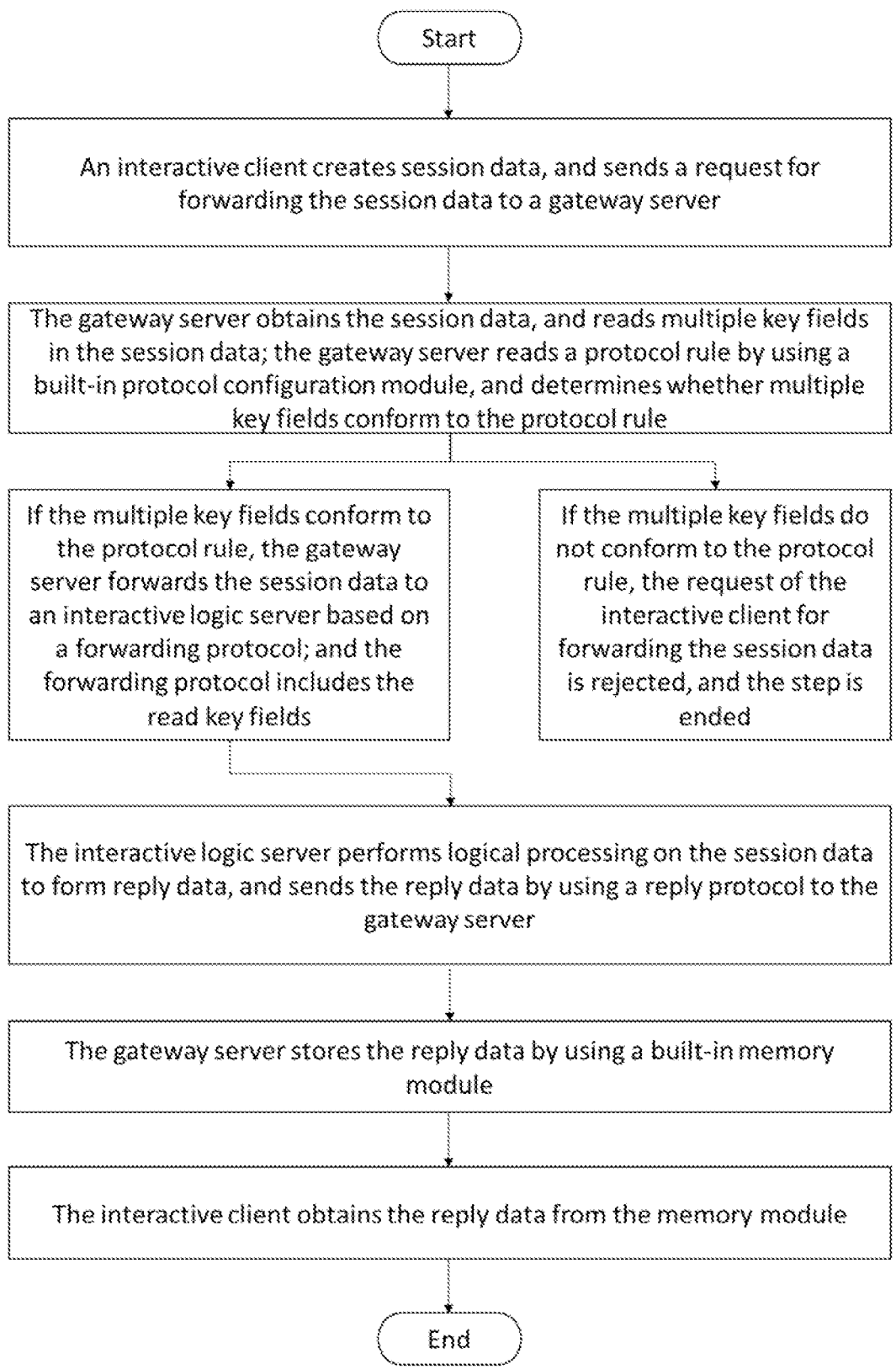
FIG. 1 is a flowchart of a method for processing session data of an interaction process provided by the present invention.

Advantages of the present invention are further described below with reference to the drawings and specific embodiments.

The exemplary embodiments are described in detail herein, and examples thereof are shown in the accompanying drawings. When the following description involves the drawings, unless otherwise indicated, the same numbers in different drawings indicate the same or similar elements. The implementations described in the following exemplary embodiments do not represent all implementations consistent with the present disclosure. Rather, the implementations are merely examples of devices and methods consistent with some aspects of the present disclosure as detailed in the appended claims.

The terms used in the present disclosure are only for the purpose of describing specific embodiments, and are not intended to limit the present disclosure. The singular forms of "a", "said" and "the" used in the present disclosure and the appended claims are also intended to include plural forms, unless the context clearly indicates other meanings. It should further be understood that the term "and/or" as used herein refers to and includes any or all possible combinations of one or more associated listed items.

It should be understood that although the terms first, second, third, etc. may be used in the present disclosure to describe various information, the information should not be limited to these terms. These terms are only used to distinguish the same type of information from each other. For example, without departing from the scope of the present disclosure, the first information may also be referred to as second information, and similarly, the second information may also be referred to as first information. Depending on the context, the word "if" as used herein can be interpreted as "when" or "while" or "in response to determining".

In the description of the present invention, it should be understood that the orientation or positional relationship indicated by the terms "longitudinal", "lateral", "upper", "lower", "front", "rear", "left", "right", "vertical", "horizontal", "top", "bottom", "inner", "outer", etc. are based on the orientation or positional relationship shown in the drawings, and are only for the convenience of describing the present invention and simplifying the description, and do not indicate or imply that the pointed device or element must have a specific orientation, or be constructed and operated in a specific orientation, and therefore cannot be understood as a limitation of the present invention.

In the description of the present invention, unless otherwise specified and limited, it should be noted that the terms "installed", "joint", and "connection" should be understood in a broad sense. For example, the connection can be a mechanical connection or an electrical connection, or may be internal communication between two elements, or may be a direct connection or an indirect connection through an intermediate medium. For the person of ordinary skill in the art, the specific meaning of the above terms can be understood according to specific conditions.

In the following description, use of suffixes such as "module", "component" or "unit" for denoting elements is only for facilitating description of the present invention and has no specific meaning. Therefore, "module" and "component" may be used in a mixed manner.

Referring to FIG. 1, the present invention discloses a method for processing session data of an interactive process, including the following steps:

An interactive client creates session data, and sends a request for forwarding the session data to a gateway server.

The gateway server obtains the session data, and reads multiple key fields in the session data. The gateway server reads a protocol rule by using a built-in protocol configuration module, and determines whether the multiple key fields conform to the protocol rule.

If the multiple key fields conform to the protocol rule, the gateway server forwards the session data to an interactive logic server based on a forwarding protocol. The forwarding protocol includes the read key fields.

The interactive logic server performs logical processing on the session data to form reply data, and sends the reply data back to the gateway server by using a reply protocol.

The gateway server stores the reply data by using a built-in memory module.

The interactive client obtains the reply data from the memory module.

If the multiple key fields do not conform to the protocol rule, the request of the interactive client for forwarding the session data is rejected, and a step is ended.

Figure 2:
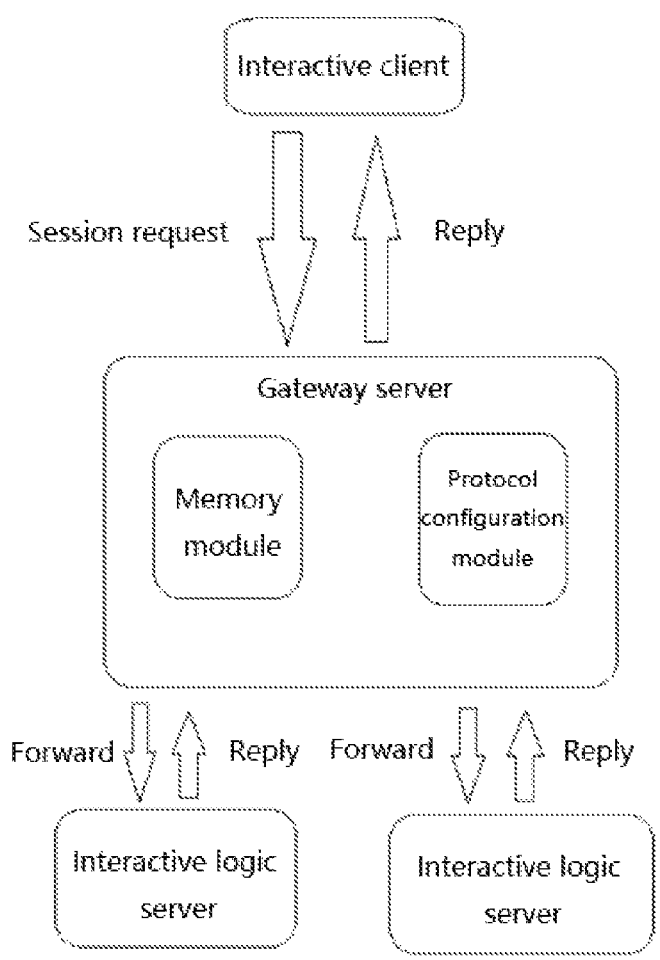
FIG. 2 is a schematic structural diagram of a system and a server group of an interactive process provided by the present invention.

Referring to FIG. 2, in the present invention, a memory module is built in a gateway server, and is used for storing session data and reply data of a player, it is convenient for quick access, and the memory module is different from a usual external storage module in the prior art. Specifically, the memory module may include a memory and a memory controller, and has faster data read and write speeds than the external memory. The gateway server reads a relevant protocol configuration file by using a built-in protocol configuration module, and the protocol configuration file is used to configure an interception rule of a protocol, and read and write fields of the session data. It can be understood that the "protocol configuration file" is a document containing the interception rule. The format of the document is not limited provided that the document can be read by an interactive client and an interactive logic server. "Protocol" is a kind of communication data, the format of the data is not limited, the data contains an interception rule, and the "protocol configuration file" is a specific representation form of the "protocol". "Configuring" in "configuring an interception rule of a protocol" is a verb, and can be understood as "setting", that is, the protocol is set. "Read and write fields of the session data" can be understood as the protocol configuration file further includes a rule for reading and writing the fields of the session data, and reading and writing of the session data can be implemented based on the rule.

When the gateway server forwards the session data to the interactive logic server, the gateway server forwards a protocol on which the forwarding process is based (hereinafter referred to as a forwarding protocol) at the same time to the interactive logic server. When the interactive logic server replies the session data to the gateway server, the interactive logic server replies a protocol on which the reply process is based (hereinafter referred to as a reply protocol) at the same time to the gateway server.

In addition, a key field in the read session data is added in the forwarding protocol forwarded by the gateway server to the interactive logic server, so that the interactive logic server quickly obtains the key field. However, a key field of the written session data is also added in the reply protocol that the interactive logic server replies to the gateway server, so that the gateway server quickly obtains the key field, thereby improving the throughput of the gateway server.

Preferably, the interactive logic server performs logical processing and modification on the session data to form reply data, and a specific modification method is to modify the session data by writing a modification field to the session data. However, the reply protocol that the interactive logic server replies to the gateway server includes the written modification field. After receiving the reply data, the gateway server reads the modification field by using the reply protocol, and stores the reply data by using the built-in memory module according to the modification field, so that the access to a peripheral cache database is avoided. In this way, the throughput of the gateway server is improved, the delay of the interface is reduced, and the stability of the server is improved.

Preferably, the protocol rule includes an interception rule and a reading rule. After obtaining the session data, the gateway server checks the passable qualification of the session data by using the interception rule, and only the session data that does not trigger interception can be forwarded to the interactive logic server. The session data is quickly identified and read by reading the rule to obtain information. The information is usually a key field with meaning. For example, when the information is applied to a game, the key field of the session data can be "a level value is 6", "updating a client version", "obtaining a historical battle record", etc. Correspondingly, the key field of "a level value is 6" indicates that a user level corresponding to the interactive client is level 6. The key field "updating a client version" indicates that the interactive client is updated to the latest version. The key field "obtaining a historical battle record" indicates that the historical battle record of the user corresponding to the interactive client is obtained, and the historical record can be all battle records or a historical battle record within a preset time.

It can be understood that the multiple key fields include multiple first key fields corresponding to the interception rule, and multiple second key fields corresponding to the read rule, and the gateway server determines whether the session data triggers interception by extracting the first key fields, and obtains information by extracting the second key fields. The key field of "a level value is 6" belongs to the first key field, because the level value in this key field directly affects whether the session data triggers interception. However, the key fields of "updating a client version" and "obtaining a historical battle record" belong to the second key fields, because the information in these key fields represents user requirements corresponding to the interactive client, and is a type of information that needs to be executed.

Specifically, the gateway server determines whether the multiple first key fields trigger interception by using the interception rule. If interception is not triggered, it indicates that the session data has a passable qualification, and therefore the gateway server further reads multiple second key fields by using the reading rule. The second key field may be a field on which information extraction can be directly performed, or may be a field for which logical processing can be performed to obtain information. After extracting the second key field, the gateway server immediately forwards the read second key field to the interactive logic server based on the forwarding protocol. If interception is triggered, a request of the interactive client for forwarding the session data is rejected.

Preferably, the session data includes, but is not limited to, basic information such as a client model, a client version, a user name, a user address, and a user level, and further includes specific session content.

Three rules and applications for protocol configuration of the gateway server are provided below:
1) The Interception Rule.

The gateway server obtains a first key field in the session data, and the first key field includes a user level. The gateway server determines whether the user level is greater than a preset level value according to the interception rule.

An application scenario of the interception rule is as follows: The gateway server is a part of a game server group, and the game server group restricts that access to the interface of the gateway server is allowed only when the user level is at or above the preset level value. For example, if the preset level is set to be level 3, if the user level extracted from the session data is only level 2, the interactive request of the session data of the interactive client is rejected: if the user level extracted from the session data is level 5, the session data of the interactive client is forwarded to the interactive logic server.

A configuration example: EnterReque preset level value t:@filter{level>=N}.

By using the interception rule, the data processing pressure of the interactive logic server is reduced, and a replay can be quickly made to the client.
2) The Reading Rule.

The gateway server obtains the second key field in the session data, and the second key field includes the client version. By identifying different client versions, the interactive logic server writes modification fields corresponding to different client versions to the session data to form different reply data.

An application scenario of the reading rule is as follows: In the game server group, different reply data needs to be returned to the client according to different client versions.

A configuration example: GetReque default level value t:@read{ver default level value ion}.

By using this reading rule, the interactive logic server can quickly obtain the client version number by using the protocol forwarded by the gateway server, so that obtaining from an external cache server is avoided, the speed is faster, and data obtaining is more stable.
3) The Writing Rule.

The interactive logic server writes a new user level into the session data to form new reply data, and the gateway server obtains the reply data replied by the interactive logic server, and the modification field in the reply data includes the user level.

The application scenario of the writing rule is as follows: In the game server group, the user sends an upgrade request to the interactive logic server by using the gateway server, and the interactive logic server updates the user level into the session data according to an upgrade request, to form reply data, and sends the reply data to the gateway server. Information of the user level can be used for a subsequent interception rule.

A configuration example: UplevelReque preset level value t:@write{level}.

By using this writing rule, the interactive logic server adds a level field in the protocol that is replied to the gateway, and therefore the gateway server can immediately write the level field to the memory module, so that writing to the external cache database is avoided, and the speed is faster.

It should be noted that the protocol configuration rules of the present invention are not limited to the above three types, and for faster processing of session data, more protocol rules can be configured according to requirements.

Figure 3:
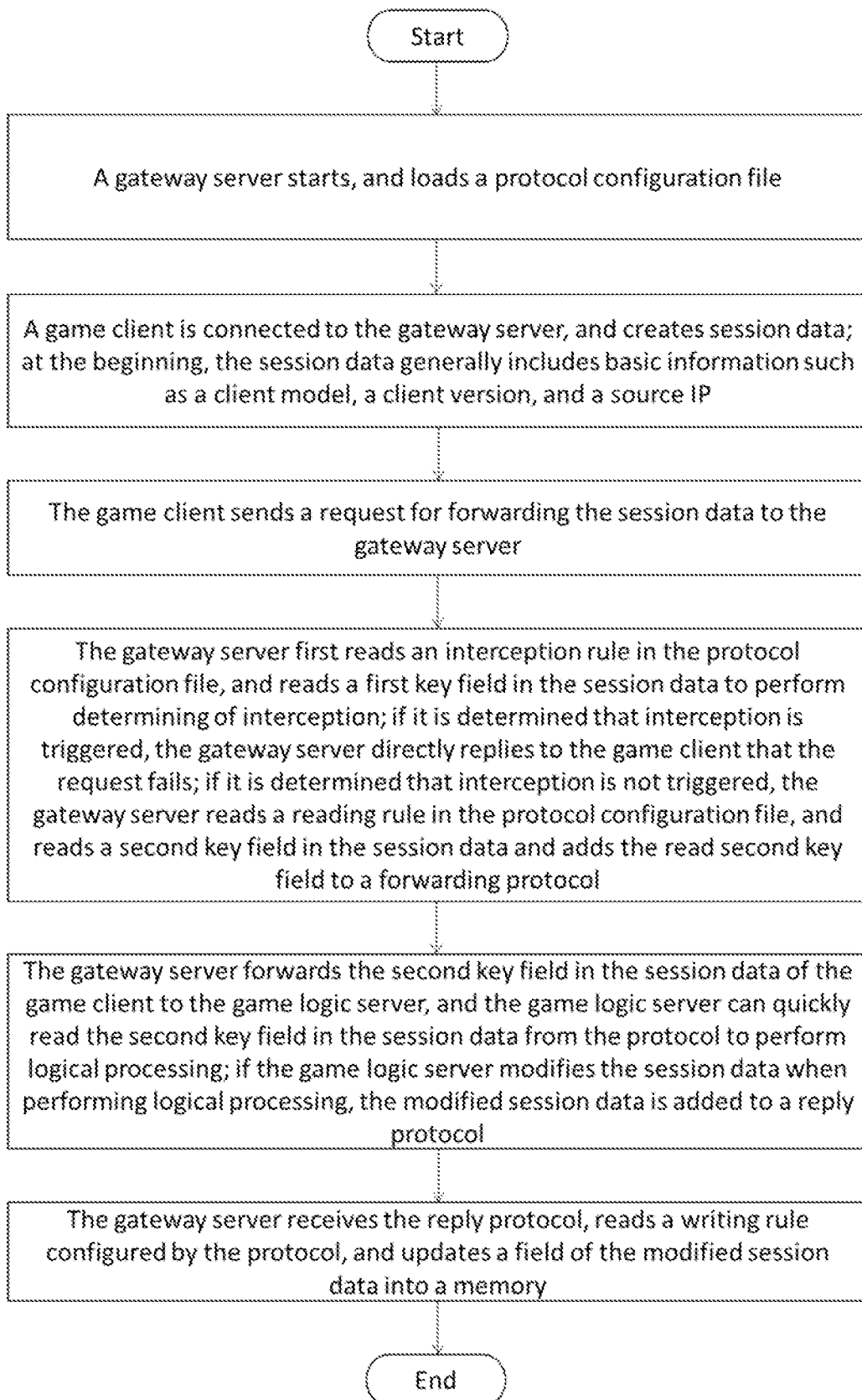
FIG. 3 is an execution flowchart of a preferred embodiment provided by the present invention.

Referring to FIG. 3, a specific embodiment of a method for using session data applied to a game server group in the present invention is provided below:

A gateway server starts, and loads a protocol configuration file.

A game client (that is, an interactive client) is connected to the gateway server, and creates session data. At the beginning, the session data generally includes basic information such as a client model, a client version, and a source IP.

The game client sends a request for forwarding session data to the gateway server.

The gateway server first reads an interception rule in the protocol configuration file, and reads a first key field in the session data to perform determining of interception. If it is determined that interception is triggered, the gateway server directly replies to the game client that the request fails. If it is determined that interception is not triggered, the gateway server reads a reading rule in the protocol configuration file, and reads a second key field in the session data, and adds the read second key field to a forwarding protocol.

The gateway server forwards the second key field in the session data of the game client to a game logic server (that is, an interactive logic server) based on the forwarding protocol, and the game logic server can quickly read the second key field in the session data from the forwarding protocol to perform logical processing. If the game logic server modifies the session data when performing logical processing, the modified session data is added to a reply protocol to form reply data.

The gateway server receives the reply data, reads a writing rule configured by the protocol, and updates a field of the modified session data (that is, the reply data) into the memory.

In the present invention, storage space and a protocol configuration rule are set inside the gateway server, so that writing and interception of session data are more efficient, and access to a peripheral cache database is avoided. In this way, the throughput of the gateway is improved, the delay of the interface is reduced, and the stability of the interface is improved. A better gaming experience is brought for users.

Referring to FIG. 2, the present invention further discloses a system for processing session data of an interactive process, including:

- an interactive client, where the interactive client is connected to a gateway server; the interactive client creates session data, and sends a request for forwarding the session data to the gateway server; and obtains reply data generated by an interactive logic server from a memory module of the gateway server;
- a gateway server, where the gateway server is connected to the interactive logic server; the gateway server obtains the session data, and reads multiple key fields in the session data; the gateway server reads a protocol rule by using a built-in protocol configuration module, and determines whether the multiple key fields conform to the protocol rule; if the multiple key fields conform to the protocol rule, the gateway server forwards the session data to the interactive logic server based on a forwarding protocol; the forwarding protocol includes the read key fields; if the multiple key fields do not conform to the protocol rule, the gateway server rejects the request of the interactive client for forwarding session data; the gateway server stores the reply data of the interactive logic server by using the built-in memory module; and
- an interactive logic server, where the interactive logic server performs logical processing on the session data to form the reply data, and sends the reply data back to the gateway server by using a reply protocol.

Referring to FIG. 2, the present invention further discloses a server group of an interactive process, connected to an interactive client, including a gateway server and an interactive logic server. The interactive client is connected to the gateway server, and the gateway server is connected to the interactive logic server.

The interactive client creates session data, and sends a request for forwarding the session data to the gateway server. The gateway server obtains the session data, and reads multiple key fields in the session data. The gateway server reads a protocol rule by using a built-in protocol configuration module, and determines whether the multiple key fields conform to the protocol rule. If the multiple key fields conform to the protocol rule, the gateway server forwards the session data to the interactive logic server based on a forwarding protocol. The forwarding protocol includes the read key fields. If the multiple key fields do not conform to the protocol rule, the gateway server rejects the request of the interactive client for forwarding the session data.

The interactive logic server performs logical processing on the session data to form reply data, and sends the reply data back to the gateway server by using a reply protocol. The gateway server stores the reply data by using a built-in memory module. The interactive client obtains the reply data from the memory module.

The present invention further discloses a computer-readable storage medium for storing an instruction for processing session data of an interactive process. The computer-readable storage medium is stored in a server group, and the server group includes a gateway server and an interactive logic server.

The interactive client is connected to the gateway server, and the gateway server is connected to the interactive logic server, that is, the gateway server is used as an interface for data transmission between the interactive client and the interactive logic server.

The interactive client creates session data, and sends a request for forwarding the session data to the gateway server. The gateway server obtains the session data, and reads multiple key fields in the session data. The gateway server reads a protocol rule by using a built-in protocol configuration module, and determines whether the multiple key fields conform to the protocol rule. If the multiple key fields conform to the protocol rule, the gateway server forwards the session data to the interactive logic server based on a forwarding protocol. The forwarding protocol includes the read key fields. If the multiple key fields do not conform to the protocol rule, the gateway server rejects the request of the interactive client for forwarding the session data.

The interactive logic server performs logical processing on the session data to form reply data, and sends the reply data back to the gateway server by using a reply protocol. The gateway server stores the reply data by using a built-in memory module. The interactive client obtains the reply data from the memory module.

It should be noted that the embodiments of the present invention have better implementations and do not limit the present invention in any form. Any person skilled in the art may use the technical content disclosed above to change or modify equivalent effective embodiments. However, any amendments or equivalent changes and modifications made to the above embodiments based on the technical essence of the present invention without departing from the content of the technical solution of the present invention still fall within the scope of the technical solution of the present invention.

The invention claimed is:

1. A method for processing session data of an interactive process, comprising the following steps:
   creating, by an interactive client, session data, and sending a request for forwarding the session data to a gateway server;
   obtaining, by the gateway server, the session data, and reading multiple key fields within the session data; and reading, by the gateway server, a protocol rule by using a built-in protocol configuration module, and determining whether the multiple key fields conform to the protocol rule;
   if the multiple key fields conform to the protocol rule, forwarding, by the gateway server, the session data to an interactive logic server based on a forwarding protocol;
   performing, by the interactive logic server, logical processing on the session data to form reply data, and sending the reply data back to the gateway server by using a reply protocol;
   storing, by the gateway server, the reply data by using a built-in memory module;

obtaining, by the interactive client, the reply data from the memory module; and if the multiple key fields do not conform to the protocol rule, rejecting the request of the interactive client for forwarding the session data, and ending a step.

2. The method for processing session data according to claim 1, wherein the performing, by the interactive logic server, logical processing on the session data to form reply data, and sending the reply data back to the gateway server by using a reply protocol comprises:

performing, by the interactive logic server, logical processing on the session data, and modifying the session data by writing a modification field to the session data, to form reply data; wherein the reply protocol comprises the written modification field; and the storing, by the gateway server, the reply data by using the built-in memory module comprises:

reading, by the gateway server, the modification field by using the reply protocol, and storing the reply data by using the built-in memory module according to the modification field.

3. The method for processing session data according to claim 2, wherein the protocol rule comprises an interception rule and a reading rule; the multiple key fields comprise multiple first key fields corresponding to the interception rule and multiple second key fields corresponding to the reading rule; and the obtaining, by the gateway server, the session data, and reading multiple key fields within the session data; and reading, by the gateway server, a protocol rule by using a built-in protocol configuration module, and determining whether the multiple key fields conform to the protocol rule comprises:

determining, by the gateway server, whether the multiple first key fields trigger interception by using the interception rule;

if interception is not triggered, reading, by the gateway server, the multiple second key fields by using the reading rule; wherein the forwarding protocol comprises the read second key field; and if interception is triggered, rejecting the request of the interactive client for forwarding the session data.

4. The processing method for session data according to claim 3, wherein the first key field comprises a user level; and the determining, by the gateway server, whether the multiple first key fields trigger interception by using the interception rule comprises:

determining, by the gateway server, whether the user level is greater than a preset level value by using the interception rule.

5. The processing method for session data according to claim 3, wherein the second key field comprises a client version; and the performing, by the interactive logic server, logical processing on the session data, and modifying the session data by writing a modification field to the session data, to form reply data comprises:

identifying, by the interactive logic server, different client versions, and writing modification fields corresponding to different client versions to the session data to form different reply data.

6. The method for processing session data according to claim 2, wherein the modification field comprises a user level; and the performing, by the interactive logic server, logical processing on the session data, and modifying the session data by writing a modification field to the session data, to form reply data comprises:

writing, by the interactive logic server, a new user level to the session data to form new reply data.

7. The processing method for session data according to claim 1, wherein the session data comprises session content, a client model, a client version, a username, a user address, and a user level.

8. A system for processing session data of an interactive process, comprising an interactive client, a gateway server, and an interactive logic server; wherein the interactive client is connected to the gateway server, and the gateway server is connected to the interactive logic server;

the interactive client creates session data, and sends a request for forwarding the session data to the gateway server;

the gateway server obtains the session data, and reads multiple key fields within the session data;

the gateway server reads a protocol rule by using a built-in protocol configuration module and determines whether the multiple key fields conform to the protocol rule;

if the multiple key fields conform to the protocol rule, the gateway server forwards the session data to the interactive logic server based on a forwarding protocol;

the interactive logic server performs logical processing on the session data to form reply data, and sends the reply data back to the gateway server by using a reply protocol;

the gateway server stores the reply data by using a built-in memory module;

the interactive client obtains the reply data from the memory module; and if the multiple key fields do not conform to the protocol rule, the gateway server rejects the request of the interactive client for forwarding the session data.

9. A server group for an interactive process, connected to an interactive client, comprising a gateway server and an interactive logic server; wherein the interactive client is connected to the gateway server, and the gateway server is connected to the interactive logic server;

the interactive client creates session data, and sends a request for forwarding the session data to the gateway server;

the gateway server obtains the session data and reads multiple key fields within the session data;

the gateway server reads a protocol rule by using a built-in protocol configuration module and determines whether the multiple key fields conform to the protocol rule;

if the multiple key fields conform to the protocol rule, the gateway server forwards the session data to the interactive logic server based on a forwarding protocol;

the interactive logic server performs logical processing on the session data to form reply data, and sends the reply data back to the gateway server by using a reply protocol;

the gateway server stores the reply data by using a built-in memory module;

the interactive client obtains the reply data from the memory module; and if the multiple key fields do not conform to the protocol rule, the gateway server rejects the request of the interactive client for forwarding the session data.

10. A computer-readable storage medium for storing an instruction of processing session data of an interactive process, stored in a server group, wherein the server group comprises a gateway server and an interactive logic server, an interactive client is connected to the gateway server, the gateway server is connected to the interactive logic server, the interactive client creates session data, and when the instruction is executed, a request for forwarding the session data sent by the interactive client to the gateway server is processed, comprising the following steps:

obtaining, by the gateway server, the session data, and reading multiple key fields in the session data; reading, by the gateway server, a protocol rule by using a built-in protocol configuration module, and determining whether the multiple key fields conform to the protocol rule;

if the multiple key fields conform to the protocol rule, forwarding, by the gateway server, the session data to the interactive logic server based on a forwarding protocol;

performing, by the interactive logic server, logical processing on the session data to form reply data, and sending the reply data back to the gateway server by using a reply protocol;

storing, by the gateway server, the reply data by using a built-in memory module;

obtaining, by the interactive client, the reply data from the memory module; and if the multiple key fields do not conform to the protocol rule, rejecting, by the gateway server, the request of the interactive client for forwarding the session data.

\* \* \* \* \*